United States Patent [19]

Say et al.

[11] 4,282,194

[45] Aug. 4, 1981

[54] PROCESS FOR CONVERTING CYCLIC UREA TO CORRESPONDING DIAMINE IN A GAS TREATING SYSTEM

[75] Inventors: Geoffrey R. Say; James R. Hays, Sr., both of Baton Rouge, La.; Jagannathan N. Iyengar, Rockaway; Barbara A. Hacker, Princeton, both of N.J.

[73] Assignee: Exxon Research & Engineering Co., Florham Park, N.J.

[21] Appl. No.: 122,589

[22] Filed: Feb. 19, 1980

[51] Int. Cl.$^3$ .............................................. B01D 53/34
[52] U.S. Cl. ................................... 423/223; 423/228; 423/232; 423/234
[58] Field of Search ............... 423/223, 228, 229, 232, 423/233, 234, 243, 236; 260/239.3 R; 544/314; 548/317

[56] References Cited

U.S. PATENT DOCUMENTS

| 4,094,957 | 6/1978 | Sartori et al. ........................ 423/223 |
| 4,100,257 | 7/1978 | Sartori et al. ........................ 423/226 |
| 4,101,633 | 7/1978 | Sartori et al. ........................ 423/228 |
| 4,112,050 | 9/1978 | Sartori et al. ........................ 423/223 |
| 4,112,051 | 9/1978 | Sartori et al. ........................ 423/223 |
| 4,112,052 | 9/1978 | Sartori et al. ........................ 423/228 |
| 4,138,468 | 2/1979 | Kettner et al. ........................ 423/228 |
| 4,180,548 | 12/1979 | Say et al. ............................ 423/223 |

FOREIGN PATENT DOCUMENTS 2810249  9/1978  Fed. Rep. of Germany.

OTHER PUBLICATIONS

Hofman, "Imidazole and Its Derivatives, Part I," Interscience Publishers, New York, 1953, p. 228.
Mulvany et al., "Synthesis of Ethylene Urea (Imidazolidone-2)", Industrial & Engineering Chemistry, vol. 40, 1948, pp. 393–397.
Smirnov et al., "Reaction of 3-Alkenyl-2,3 Dialhylpseudoureas with Hydrazoic Acid", Zhurnal Obschchei Khimii, vol. 35, 1965, pp. 178–181.
Dingman et al. "Compare DGA and MEA Sweeting Methods", Hydrocarbon Processing, vol. 17, No. 7, Jul. 1968, pp. 138–140.

*Primary Examiner*—Earl C. Thomas
*Attorney, Agent, or Firm*—Edward H. Mazer

[57] ABSTRACT

Acidic gases such as carbon dioxide are removed from a normally gaseous mixture including the acidic component by contacting the gaseous mixture in an absorption zone with an acid absorbing scrubbing solution comprising a basic alkali metal compound and an activator for the compound, during which process at least a portion of the activator is converted to a cyclic urea. The solution is then transferred to the desorption zone to remove at least a portion of the absorbed acidic component. At least a portion of the partially desorbed scrubbing solution containing the cyclic urea is transferred from the desorption zone to a thermal conversion zone maintained at an elevated temperature wherein at least a portion of the cyclic urea is converted back to the activator. A portion of the scrubbing solution from the thermal conversion zone, relatively rich in the acidic component is vaporized and returned to the desorption zone, and another portion, relatively lean in the acidic component, is returned from the thermal conversion zone to the absorption zone.

11 Claims, 4 Drawing Figures

PROCESS FOR CONVERTING CYCLIC UREA TO CORRESPONDING DIAMINE IN A GAS TREATING SYSTEM

CROSS REFERENCE TO RELATED APPLICATIONS

This application is related to U.S. patent application Ser. No. 122,588 filed on even date herewith.

BACKGROUND OF THE INVENTION

1. Field of the Invention

This invention relates to an improved process for removing acidic components from gaseous mixtures containing acidic components by the use of a salt solution comprising at least one sterically hindered substituted diamine. More particularly the invention relates to the conversion of a cyclic urea degradation product, which is formed from the sterically hindered amine, back to the original sterically hindered amine form.

2. Description of the Prior Art

It is well-known in the art to treat gases and liquids, such as mixtures containing acidic gases including $CO_2$, $H_2S$, $SO_2$, $SO_3$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid countercurrently.

The acid scrubbing processes known in the art can be generally broken into three categories.

The first category is generally referred to as the aqueous amine process where relatively large amounts of amine solution are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressures of the $CO_2$ and other gases are low.

A second category is generally referred to as the aqueous base scrubbing process or "hot potash" process. In this type of process an amine is included as an activator for the aqueous base used in the scrubbing solution. This type of process is generally used where bulk removal of an acid gas, such as $CO_2$, is desired. This process also is applied to situations where the $CO_2$ and feed gas pressures are high. In such processes, useful results are acheived using aqueous potassium carbonate solutions and an amine activator.

A third category is generally referred to as the nonaqueous solvent process. In this process, water is a minor constituent of the scrubbing solution and the amine is dissolved in the liquid phase containing the solvent. In this process, the amine comprises up to 50% of the liquid phase. This type of process is utilized for specialized applications where the partial pressure of $CO_2$ is extremely high and/or where many acid gases are present, e.g. COS, $H_2S$, $CH_3SH$ and $CS_2$.

The present invention pertains to an improved process for practicing the second category of acid scrubbing process described above, namely, the aqueous base scrubbing process or "hot potash" process. Many industrial processes for removal of acid gases, such as $CO_2$, use regenerable aqueous alkaline scrubbing solutions, such as an amine and potassium carbonate, which are continuously circulated between an absorption zone, where acid gases are absorbed and a regeneration zone, where they are desorbed, usually by steam-stripping. The capital cost of these acid scrubbing processes is generally controlled by the size of the absorption and regeneration towers, the size of the reboilers for generating stripping steam, and the size of the condensers which condense spent stripping steam so that condensate may be returned to the system to maintain proper water balance. The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe improvements to increase the efficiency of the "hot potash" process. Some of these improvements are described below.

U.S. Pat. No. 4,112,050, the disclosure of which is incorporated herein by reference, discloses the use of an aqueous solution comprising a basic alkali metal salt or hydroxide and a sterically hindered diamine activator for removing acid gases from a gaseous mixture. The sterically hindered amines are defined to include aminoethers, aminoalcohols, di- and triamines wherein the amino compounds contain at least one secondary amino group attached to either a secondary or tertiary carbon atom or a primary amino group attached to a tertiary carbon atom. U.S. Pat. No. 4,112,051 discloses the use of a sterically hindered diamine and a solvent for the amine, where the solvent is also an absorbent for the acidic gases. U.S. Pat. No. 4,112,052 is also directed at scrubbing solutions utilizing sterically hindered diamines. U.S. Pat. No. 4,094,957 is directed at the use of an aqueous solution comprising a basic salt, a sterically hindered diamine and an aminoacid cosolvent, the aminoacid cosolvent serving to prevent phase separation of the aqueous solution. U.S. Pat. No. 4,100,257 and 4,101,633 disclose the use of an amine mixture comprising a sterically hindered diamine and a tertiary amino alcohol for removal of acidic gases. U.S. Pat. No. 4,100,257 also discloses the use of the amine mixture in combination with a solvent which is also a physical absorbent for the acidic gases. These patents do not recognize that a portion of the diamine may be converted to a degradation product which is a cyclic urea, nor do these patents disclose a method for converting the cyclic urea back to its respective diamine. U.S. patent application Ser. No. 972,500 discloses that a cyclic urea degradation product may be formed from the sterically hindered diamine. However, this patent teaches that the cyclic urea should be removed from the solution by selective precipitation and filtration. This patent does not recognize that the cyclic urea can be reconverted back to the parent diamine while still in solution.

Dutch Pat. No. 78.12064 discloses a method for regenerating an aqueous scrubbing solution containing an amine which is contaminated by an oxazolidone. A fraction containing the oxazolidone is distilled off continuously.

U.S. Pat. No. 4,138,468 discloses a method for removing acidic gases such as $CO_2$ and $H_2S$ from a gaseous mixture by contacting the mixture with an alkanolamine. During this process some of the alkanolamine is converted to an oxazolidone, which is reconverted back to the alkanolamine by hydrolysis in a reactor maintained at 140° to 200° C. This process requires the addition of water to effect the hydrolysis and requires a minimum hydrolysis time of 48 hours. The water of the hydrolyzed liquid is separated after which the alkanolamine is separated from the oxazolidone.

In *Imidazole and Its Derivatives Part I*, Interscience Publishers (1953) at page 228, the hydrolysis of the cyclic urea, 2-imidazolidone, into ethylenediamine is disclosed, the author indicating, however, that the reaction requires a drastic hydrolysis with acid or alkali. In Ind. and Eng. Chemistry 40, 393 (1948) it is disclosed that 2-imidazolidone can be hydrolyzed with water at 200° C. *Zhur Obs Khim* (1965) at 35, page 178 discloses that 1-methyl 2 imidazolidone can be hydrolyzed to N-methylethylenediamine by refluxing in a 20% NaOH solution.

It is desirable to provide a process for the conversion of undesired cyclic urea formed as a reaction product in an acid gas scrubbing solution which utilizes relatively moderate hydrolysis conditions, and is both continuous and capable of being utilized directly with conventional scrubbing equipment. It is also desirable to provide a process in which the hydrolysis can be effected in a relatively simple vessel in a relatively short time without the addition of other compounds to the scrubbing solution.

When certain sterically hindered diamines are present in a potassium carbonate solution and are contacted with $CO_2$, the amine is partially converted to the carbamate form according to the following reaction:

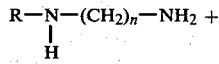

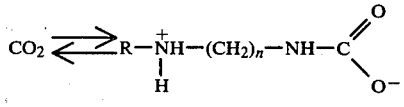

where R is a secondary or tertiary alkyl group and n is 2, 3 or 4.

It has been discovered that a portion of the activator may be converted to the corresponding cyclic urea. This reduces the performance of the scrubbing solution by decreasing the concentration of activator. This, in turn, inhibits the $CO_2$ pick-up rate and also may lead to operational problems by forming two separate liquid phases. As described hereinafter, a method has been discovered for reducing the concentration of cyclic urea by converting at least a portion thereof back to its original diamine thereby improving the efficiency of the gas treating system.

SUMMARY OF THE INVENTION

This invention relates to a method for removing an acidic component from a gaseous mixture including the acidic component which comprises:

(a) contacting the gaseous mixture in an absorption zone with an acid-absorbing scrubbing solution comprising:

(i) a basic alkali metal compound selected from the class consisting of alkali metal bicarbonates, carbonates, hydroxides, borates, phosphates and their mixtures; and (ii) an activator for said basic alkali metal compound having the formula

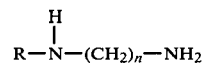

where R is a secondary or tertiary alkyl group and n is the integer 2, 3 or 4, whereby at least some of the acidic component is absorbed by the scrubbing solution and whereby at least some of said activator is converted to a cyclic urea having the formula

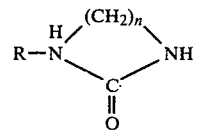

(b) passing at least a portion of the scrubbing solution containing the absorbed acidic component and the cyclic urea from the absorption zone to a desorption zone wherein at least a portion of the absorbed acidic component is desorbed; and (c) passing at least a portion of the partially desorbed scrubbing solution from the desorption zone to a thermal conversion zone maintained at an elevated temperature sufficient to convert at least a portion of the cyclic urea back to the activator, the thermal conversion zone communicating with both the absorption zone and the desorption zone whereby a portion of the scrubbing solution in the thermal conversion zone relatively rich in acidic component is vaporized and returned to the desorption zone, and another portion of the scrubbing solution in the thermal conversion zone relatively lean in the acidic component is returned to the absorption zone.

DETAILED DESCRIPTION OF THE INVENTION

Figure 1:
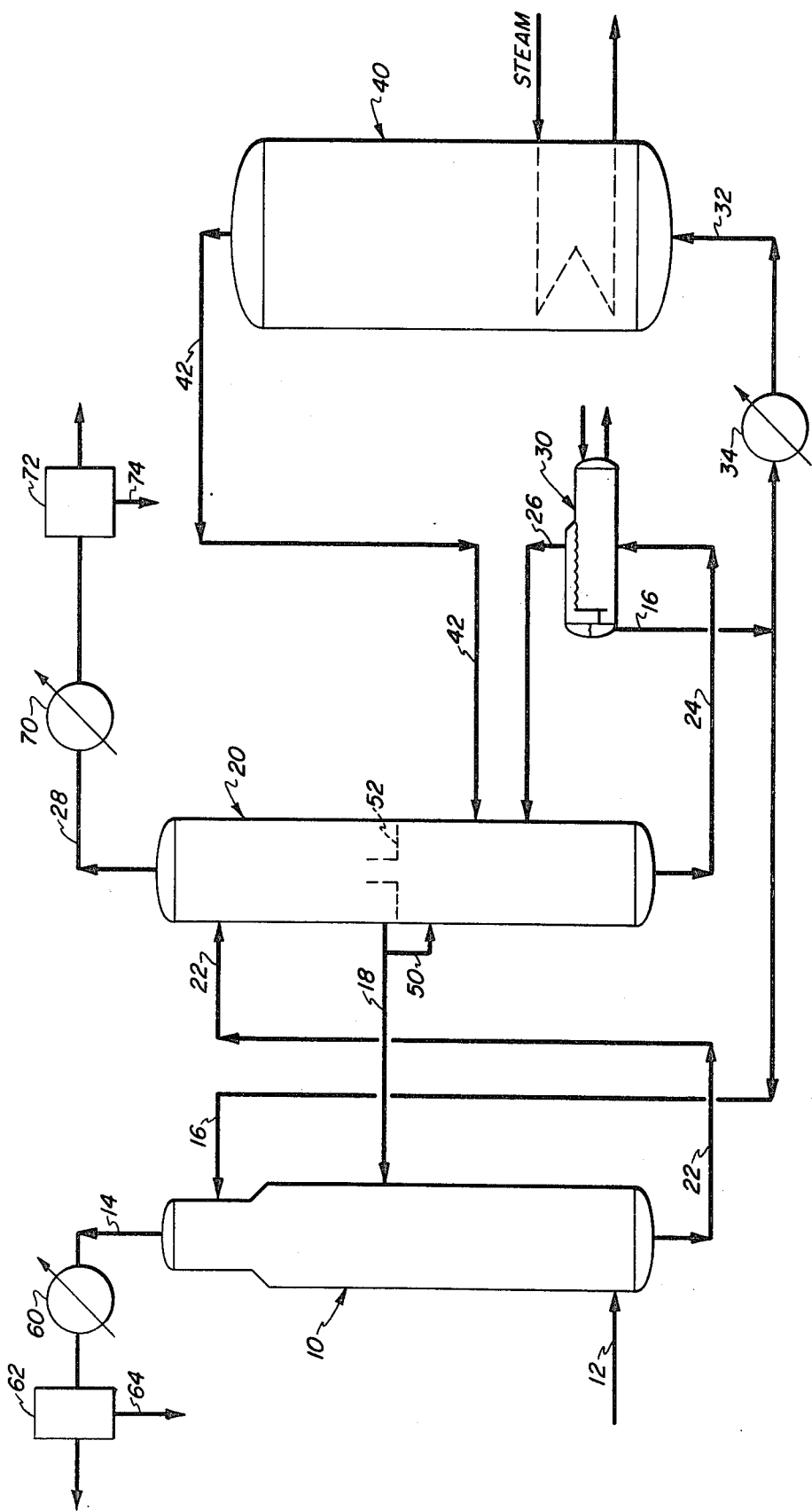
FIG. 1 is a flow sheet of a gas treatment process illustrating one embodiment of the invention.

The term acid-containing gases as used hereinafter includes $CO_2$ as well as $H_2S$, $SO_2$, $SO_3$, $CS_2$, HCN, COS and the oxygen and sulfur derivatives of $C_1$ to $C_4$ hydrocarbons in various amounts as they frequently appear in gaseous mixtures. Except for $CO_2$ and $H_2S$, these gases normally are present only in small amounts within a gaseous mixture or feed.

The absorbing solution utilized in the subject invention comprises an aqueous solution having a basic alkali metal compound selected from the group consisting of alkali metal bicarbonates, carbonates, hydroxides, borates, phosphates and their mixtures, the alkali metal compound preferably being present as about 10 to about 40 weight percent of the entire weight of the solution. Most preferably, potassium carbonate is used in a concentration of about 20 to 35 weight percent.

The activator, normally present in concentrations of about 2 to about 20 weight percent, has the structure:

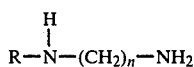

where R is a secondary or tertiary alkyl group and n is the integer 2, 3 or 4. The preferred activators are N-cyclohexyl-1,3-propanediamine (CHPD) and N-cyclohexyl-1,2-ethanediamine (CHED) and N-cyclohexyl-1,4-butanediamine (CHBD), with the most preferred being the CHPD compound. The preferred concentration of the subject activator is from about 0.5 to about 15 weight percent, and, most preferably, from about 1 to about 10 weight percent.

It has been found that while the above-noted activators improve the working capacity of acid scrubbers over the prior art, the efficiency of the absorbing solutions declines in alkaline scrubbing systems at high temperatures and at low concentrations of the acid gas in the solution due to phase separation. Thus, a cosolvent preferably is added to the absorbing solution to prevent phase separation. The preferred cosolvents are amino acid cosolvents, with the more preferred being amino acid cosolvents having from 4 to 8 carbon atoms. The most preferred cosolvent is pipecolinic acid (PA). The content of the amino acid cosolvent in the absorbing solution will range from about 0.5 to about 15 weight percent, with the preferred range being about 1 to about 10 weight percent.

When the above-described absorbing solution is used to remove acid gases it has been found that a portion of the activator is converted to a cyclic urea. The rate of formation of the cyclic urea is in part, dependent upon the temperature and composition of the scrubbing solution including the concentration of $KHCO_3$ and $KHS$ in solution. For example, for the preferred embodiments previously described the overall reactions in which cyclic urea is formed are formally shown as follows:

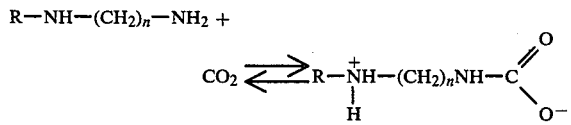

The carbamate can then undergo further reaction to form a cyclic urea.

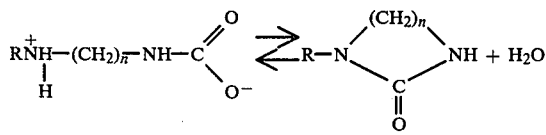

where R is a secondary or tertiary alkyl group and n is an integer 2, 3 or 4. This formation of cyclic urea decreases the performance of the scrubbing solution by depleting the solution of activator thereby reducing the $CO_2$ pick-up rate, and also may lead to operational problems due to the tendency of the absorbing solution to form multiple phases when cyclic urea is present in significant quantities.

This invention is directed at the discovery that if at least a portion of the absorbing solution is heated at a temperature in the range of 120° to 200° C., preferably in the range of 140°–190° C., with the $CO_2$ loading maintained below a predetermined level, at least some of the cyclic urea will be converted back to its respective diamine form.

Figure 4:
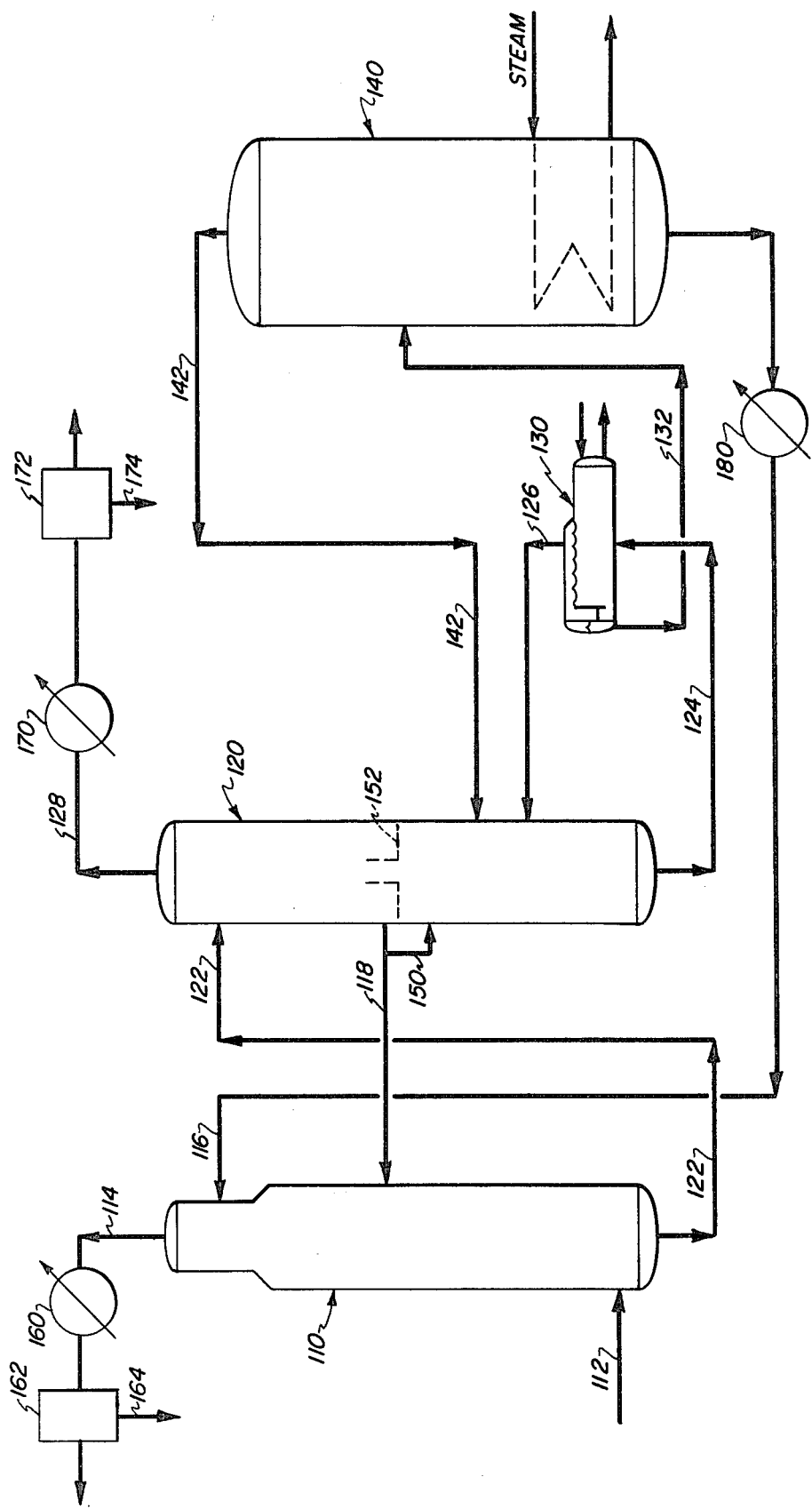
FIG. 4 is a flow sheet of a gas treatment process illustrating another embodiment of the invention.

FIGS. 1 and 4 describe processes for scrubbing acid gas streams and for converting cyclic urea back to its respective diamine form. In these figures, pumps, valves, instrumentation and ancillary piping have been omitted for simplicity.

Referring to FIG. 1, a gas treating process is shown, including a conventional scrubbing system. The scrubbing system comprises an absorption zone and a desorption zone. Contacting of the absorbing or scrubbing solution and the feed may take place in any suitable absorption zone, such as contacting absorber or scrubber 10. Scrubber 10 may be filled with conventional packing, or may be equipped with bubble cap plates or sieve plates, or the scrubber may be a baffle reactor. The feed normally is introduced into the base of scrubber 10 through line 12. The gaseous mixture from which the acid gases have been largely removed exits through line 14 located at the top of scrubber 10. A condenser 60 and knockout pot 62 preferably are added to remove condensables and transfer them to reboiler 30 or to regenerator 20 through line 64 or in part, removed from the system to maintain the desired water balance in the scrubbing solution. The semi-lean scrubbing solution enters near the mid-point of scrubber 10 through line 18, while the lean scrubbing solution enters near the top of scrubber 10 through line 16, and both flow by gravity downwardly through the scrubber during which time the acid gas, e.g., $CO_2$, is absorbed by the solution. The acid-absorbed solution is removed from the bottom of scrubber 10 and transferred to a regeneration or desorption zone, such as desorber 20, through transfer line 22. The pressure in scrubber 10 may vary widely depending upon the specifics of the system. Acceptable pressures may range between 5 and 2000 psig, preferably 100 to 1500 psig, and most preferably 200 to 1000 psig.

Preferably, the temperature of the absorbing solution during the absorption step is in the range of from about 25° C. to about 200° C. and more preferably from 60° C. to about 120° C. The partial pressure of the acid gas, e.g. $CO_2$, in the feed mixture preferably will be in the range of from about 0.1 to about 500 psia, and more preferably in the range of from about 1 to about 400 psia. The contacting takes place under conditions conducive to the absorption of the $CO_2$ by the absorbing solution. Generally, the countercurrent contacting by the absorbing solution to remove the acid gases lasts for periods ranging from 0.1 to 60 minutes, typically from 1 to 5 minutes.

Figure 2:
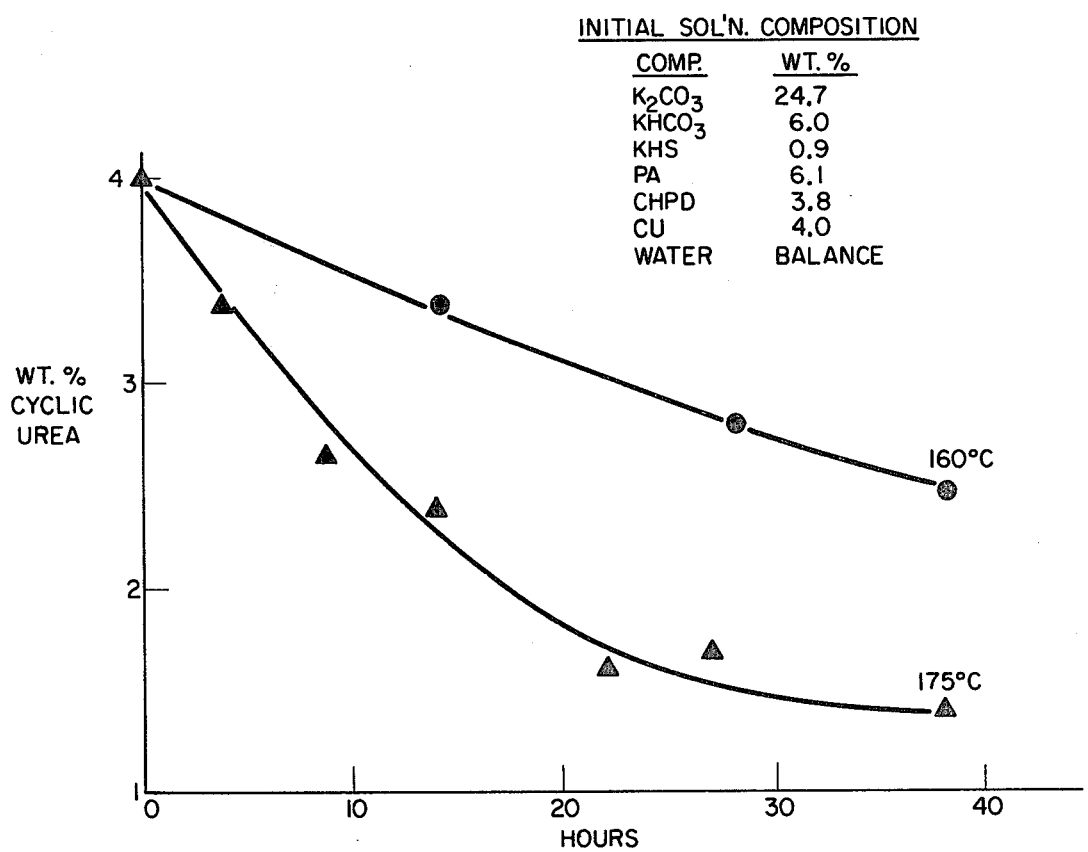
FIG. 2 is a plot of the concentration of a cyclic urea in an aqueous absorbing solution as a function of time at two temperatures.

The desorption may be accomplished by conventional means, such as pressure reduction, which causes the acid gases to flash off. In this embodiment, the acid-absorbed solution enters desorber 20, generally similar to scrubber 10, at or near the top of the desorber through line 22 while an inert gas such as air, nitrogen, or preferably steam is passed upwardly through the desorber from a source (not shown). The vapors exiting desorber 20 through line 28 preferably are passed through condenser 70 and knock-out pot 72 before exiting the system. Condensibles are returned from knock-out pot 72 to reboiler 30 or to the top of desorber 20 through line 74 or, in part, removed from the system to maintain the desired water balance in the scrubbing solution. During desorption, the temperature of the solution may be about 25° to about 200° C., preferably about 60° C. to about 125° C. In this process, a majority of the absorbing solution is transferred as a semi-lean solution from chimney tray 52 of desorber 20 to scrubber 10 through line 18. A relatively small amount of the solution is directed through line 50 downwardly to the bottom of the desorber where it is transferred from desorber 20 through line 24 to reboiler 30, supplied with an external source of heat. The reboiler vaporizes a portion of this fluid, which then is returned to desorber 20 through line 26. A lean liquid stream from reboiler 30 containing a regulated concentration of $CO_2$ exits through line 16, where, in accordance with the subject invention, a portion of this stream passes through line 32 to thermal conversion tank 40 for conversion of the cyclic urea back to its respective diamine. A heat exchanger 34 may be added to line 32 to preheat the solution before it enters tank 40. The remainder of the lean absorbing solution is recycled to the top of scrubber 10 through line 16. In this process, tank 40 is maintained at a temperature of about 120° C. to 200° C., preferably about 140° C. to about 190° C. After sufficient holdup in tank 40, normally about three to five hours, the solution is transferred back into the base of desorber 20 through line 42 where the solution will flash, thereby decreasing slightly the heat load required from reboiler 30. FIG. 2 is a plot of the rate of conversion of cyclic urea back to CHPD as a function of time at two temperatures. In a typical scrubbing system the tank normally will contain about 5 to about 50% of the total scrubbing solution inventory. The actual volume required will be dependent upon the scrubbing solution composition and the operating conditions of the system. The rate of conversion of cyclic urea to its parent diamine is a function of many factors including, but not limited to, $CO_2$ loading in the solution, the hydrogen sulfide concentration, the solution temperature and cyclic urea concentration. The $CO_2$ loading of a scrubbing solution may be defined as:

$$\frac{(\text{moles of } CO_2)}{(0.5)(\text{moles of alkali metal ion})} \times [100\%]$$

In a typical scrubbing solution exiting from reboiler 30 comprising 30 wt.% $K_2CO_3$ (where all the potassium present is expressed as being in the carbonate form), 6 wt.% CHPD, 1.5 wt.% cyclic urea, 6 wt.% pipecolinic acid, and the balance water, the $CO_2$ loading expressed as [(moles of $CO_2$)/0.5 moles $K^+$),]×[100%]. should be maintained below about 20%, with the preferred range being between about 8 and about 15%. Above about 20% it has been found that the net hydrolysis reaction does not occur in tank 40, and additional cyclic urea is, in fact, formed in the thermal conversion tank. The temperature preferably is maintained at as high a temperature as possible without degrading the solution components, since the hydrolysis reaction is temperature dependent. When the aforementioned solution is used, the temperature in tank 40 preferably is maintained between about 140° and 190° C. It has been found that the rate of conversion of a cyclic urea to its respective parent diamine increases as the concentration of cyclic urea in the scrubbing solution increases. Since it is not desired to have the cyclic urea precipitate from the solution at any place in the scrubbing system, the concentration of cyclic urea preferably is maintained just slightly below the point at which precipitation will occur. As used herein the term "precipitation" is defined to be the separation of particles from the solution irrespective of whether the particles sink to the bottom or float on the surface of the solution. Precipitation of cyclic urea is a function of many variables, including, but not limited to, solution composition and temperature. For the aforementioned scrubbing solution, the cyclic urea concentration is slightly below the point at which cyclic urea would precipitate from the scrubbing system and cause operating problems. For the aforementioned scrubbing solution, the cyclic urea concentration preferably is maintained in the range of about 1.3 to about 1.6 wt.%.

Figure 3:
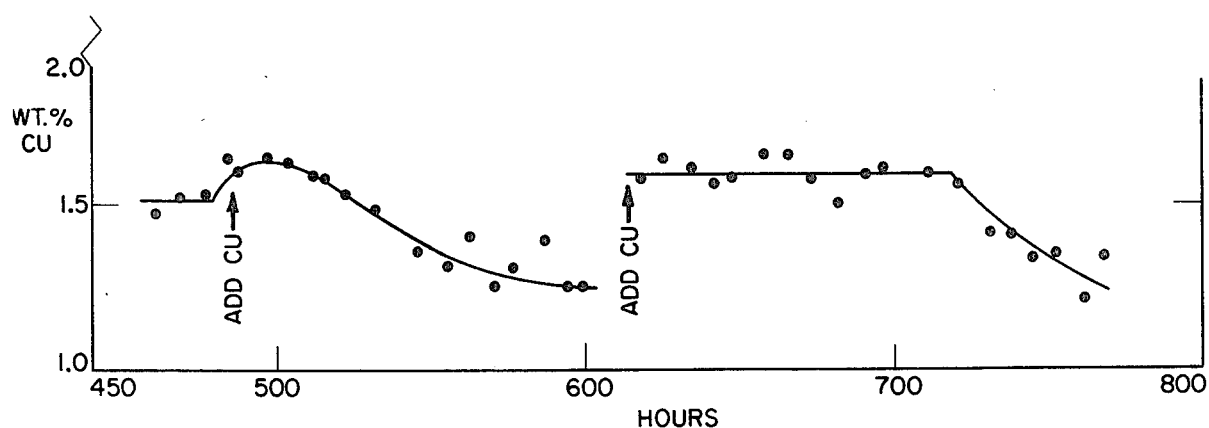
FIG. 3 is a plot of the concentration of a cyclic urea in a scrubbing solution as a function of time for a continuously circulating system.

FIG. 3 illustrates the effectiveness of the process of FIG. 1 in reducing the level of cyclic urea in the system from that which would result if there were no thermal conversion tank 40 in the system. FIG. 3 is a plot of the concentration of cyclic urea in the scrubbing solution as a function of time, during which time certain process changes were made. The scrubbing solution, initially comprising 25.0 wt.% $K_2CO_3$
4.5 wt.% $KHCO_3$
5.0 wt.% CHPD
6.0 wt.% pipecolinic acid
59.5 wt.% water was continuously circulated through scrubber 10 desorber 20 and reboiler 30, and thence about 5 wt.% of the scrubbing solution was transferred through line 32 into thermal conversion tank 40. From the commencement of the test period until hour 510 no heat was applied to tank 40. During this period, the cyclic urea concentration increased slightly due to the conversion of CHPD to cyclic urea. In order to simulate a desired operating regime, some cyclic urea then was added to the circulating solution to give a concentration of about 1.6 wt.% cyclic urea with a CHPD concentration of about 5 wt.%. At hour 510 heat was applied to thermal conversion tank 40. After an average residence time of about 3.5 hours at 175° C., this solution was continuously returned to desorber 20 through line 42. It should be noted that this passing of the scrubbing solution through tank 40 maintained at an elevated temperature resulted in a decrease in the cyclic urea concentration. At hour 610 cyclic urea was added to the scrubbing solution to raise the CU content back to about 1.6 wt.%. From hour 610 to hour 720 heat was not applied to tank 40. It should be noted that during this time period, the elevated cyclic urea level of the scrubbing solution was not lowered by the scrubbing system. From hour 720 through hour 780 the 5 wt.% of the liquid solution passing from reboiler 30 through line 32, tank 40 and line 42 was again heated in tank 40 decreasing the CU concentration as shown in FIG. 3.

Referring to FIG. 4, an alternate process for operating a gas treating system is disclosed for converting cyclic urea back to its respective diamine. Scrubber 110 and desorber 120 are substantially similar to scrubber 10 and desorber 20 of the previously described process. Feed gas enters scrubber 110 through line 112 located at the base of the scrubber and exits through line 114 at the top of the scrubber. The exiting gas may be passed through condenser 160 and knock-out pot 162 to remove any condensibles present in the exiting gas stream. The condensibles may be passed from knock-out pot 162 to reboiler 130 or desorber 120 through line 164. At least a portion of the absorbing solution passes downwardly through scrubber 110 and is removed through line 122 for transfer to desorber 120 where at least a portion of the volatiles are separated by flashing. The volatiles exiting desorber 120 through line 128 preferentially are passed through condenser 170 and knock-out pot 172 to remove any condensibles present therein. The condensibles are transferred to reboiler 130 through line 174. The desorbed scrubbing solution passes downwardly through desorber 120 with the major portion being returned as a semi-lean solution to scrubber 110 from chimney tray 152 through line 118. A minor portion passes from chimney tray 152 through line 150 to the bottom of the desorber and exits through transfer line 124. The minor portion of the solution then flows into reboiler 130, having an external source of heat, where the solution is flashed, the vapor portion entering desorber 120 through line 126 and the liquid portion passing from line 132 through a side nozzle into thermal conversion tank 140 having an external source of heat to maintain tank 140 at an elevated temperature and pressure, preferably 140° to 190° C. for an extended period, preferably 1 to 3 hours during which cyclic urea is converted back to the original diamine.

The scrubbing solution in tank 140 is split into two streams a vaporized stream relatively rich in acidic component, such as $CO_2$, which is returned to desorber 120 through line 142 and a non-vaporized relatively lean solution, i.e. low in acidic component, which is recirculated to scrubber 110 through heat exchanger 180 and line 116.

The flashing off of at least a portion of the $CO_2$ in the tank 140 results in two advantages of the process of FIG. 4 over that of FIG. 1. It has been found that the rate of conversion of cyclic urea is enhanced by the at least partial removal of $CO_2$ from the scrubbing solution in tank 140. It has also been found that recirculation of the scrubbing solution from tank 140 through line 116 and heat exchanger 180 to a point at or near the top of scrubber 110 results in a higher degree of $CO_2$ removal from the feed gas than the process of FIG. 1 as shown by the following example, since the residual acid gas concentration in the treated gas is dependent in part on the acid gas concentration of the scrubbing solution.

EXAMPLE I

|  | Flow Arrangement of | |
| --- | --- | --- |
|  | FIG. 1 | FIG. 4 |
| Reclaimer Pressure, psig | 100–150 | 25 |
| Reclaimer Temp., °C. | 175 | 175 |
| Lean Solution Composition, wt. % | | |
| $K_2CO_3$ | 24.3 | 25.9 |
| $KHCO_3$ | 5.6 | 3.3 |
| CHPD | 5.5 | 5.5 |
| Cyclic Urea | 1.6 | 1.6 |
| Pipecolinic Acid | 6.0 | 6.0 |
| Water | Balance | Balance |
| $CO_2$ in Absorber Product Gas, Vppm | 260 | 62 |
| Relative Reclaimer Volume | 1.0 | 0.33 |

It may be seen that the embodiment of FIG. 4 achieves better $CO_2$ removal than that of FIG. 1 and that the rate of conversion of cyclic urea to CHPD is such that thermal conversion tank 140 need be only about ⅓ the size of thermal reclaimer tank 40.

At a scrubber gas outlet temperature of 200° F., the $CO_2$ concentration in the gas exiting through line 14 of FIG. 1 was 260 parts per million by volume (VPPM) while the $CO_2$ concentration in line 114 of FIG. 4 was about 62 VPPM. The process substantially similar to that of FIG. 4 thus may achieve a lower exiting $CO_2$ concentration than that of the process of FIG. 1, but at a possible energy penalty, since stream 116 may have to be cooled by heat exchanger 180 prior to entering scrubber 110. The $CO_2$ concentration in the process of FIG. 1 may be further reduced by increasing the absorbing solution circulation rate and reboiler duty. The exact method used is, therefore, dependent upon the specifics of the system and the parameters noted above.

While the invention has been described in connection with specific embodiments, it will be understood that this invention is capable of further modification, and that this application is intended to cover any variations, uses or adaptations of the invention and including such departures from the present disclosure as come within known or customary practice in the art to which the invention pertains and as may be applied to the essential features hereinbefore set forth, and as fall within the scope of the invention.

What is claimed is:

1. A method for removing carbon dioxide from a gaseous mixture including carbon dioxide which comprises:

(a) contacting the gaseous mixture in an absorption zone with an acid-absorbing scrubbing solution comprising:

(i) a basic alkali metal compound selected from the class consisting of alkali metal bicarbonates, carbonates, hydroxides, borates, phosphates and their mixtures; and (ii) an activator for said basic alkali metal compound having the formula

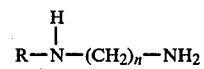

where R is a secondary or tertiary alkyl group and n is the integer 2, 3 or 4, whereby at least some of the acidic component is absorbed by the scrubbing solution and whereby at least some of said activator is converted to a cyclic urea having the formula

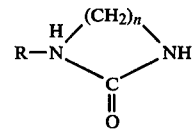

(b) passing at least a portion of the scrubbing solution containing the absorbed carbon dioxide and the cyclic urea from the absorption zone to a desorption zone wherein the carbon dioxide loading of the scrubbing solution is reduced to below about 20%; and (c) passing at least a portion of the scrubbing solution from the desorption zone to a thermal conversion zone maintained at a temperature within the range of 120° C. to 200° C. to convert at least a portion of the cyclic urea back to the activator, the thermal conversion zone communicating with both the absorption zone and the desorption zone whereby a portion of the scrubbing solution in the thermal conversion zone relatively rich in carbon dioxide is vaporized and returned to the desorption zone, and another portion of the scrubbing solution in the thermal conversion zone relatively lean in carbon dioxide is returned to the absorption zone.

2. The method of claim 1 wherein the temperature in the thermal conversion zone is maintained within the range of about 140° to about 190° C.

3. The method of claim 2 wherein the portion of the scrubbing solution returned from the thermal conversion zone to the absorption zone is cooled prior to entering the absorption zone.

4. The method of claim 3 wherein a portion of the scrubbing solution passing from the desorption zone is returned to the absorption zone.

5. The method of claim 4 wherein the portion of the scrubbing solution returned from the desorption zone to the absorption zone is returned at a location below that at which the portion of the scrubbing solution from the thermal conversion zone is returned to the absorption zone.

6. The process of claim 5 wherein the scrubbing solution further comprises a cosolvent.

7. The process of claim 6 wherein the cosolvent has 4 to 8 carbon atoms.

8. The process of claim 7 wherein the activator is N-cyclohexyl-1,3-propanediamine.

9. The process of claim 7 wherein the activator is N-cyclohexyl-1,2-ethanediamine.

10. The process of claim 7 wherein the activator is N-cyclohexyl-1,4-butanediamine.

11. A method for removing an acidic component from a gaseous mixture including the acidic component which comprises:
   (a) contacting the gaseous mixture in an absorption zone with a scrubbing solution comprising:
      (i) a basic alkali metal compound selected from the class consisting of alkali metal bicarbonates, carbonates, hydroxides, borates, phosphates and their mixtures; and
      (ii) an activator for said basic alkali metal compound having the formula:

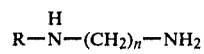

where R is a secondary or tertiary alkyl group and n is the integer 2, 3 or 4; and
      (iii) a cosolvent having 4 to 8 carbon atoms, whereby at least some of the acidic component is absorbed by the scrubbing solution and whereby at least some of said activator is converted to a cyclic urea;
   (b) passing the scrubbing solution containing the absorbed acidic component and the cyclic urea from the absorption zone to a desorption zone wherein at least a portion of the absorbed acidic component is desorbed;
   (c) returning a portion of the partially desorbed scrubbing solution from the desorption zone to the absorption zone; and
   (d) passing a portion of the partially desorbed scrubbing solution from the desorption zone to a thermal conversion zone maintained at a temperature within the range of about 140 to about 190° C. to convert at least a portion of the cyclic urea back to the activator, the thermal conversion zone communicating with both the absorption zone and the desorption zone, whereby a portion of the scrubbing solution in the thermal conversion zone relatively rich in the acidic component is vaporized in the thermal conversion zone and returned to the desorption zone, and a portion of the scrubbing solution in the thermal conversion zone relatively lean in the acidic component is returned after cooling, to the absorption zone at a location above that at which the scrubbing solution from the desorption zone is returned to the absorption zone.

* * * * *